United States Patent [19]

Hendrickson

[11] Patent Number: 5,044,674
[45] Date of Patent: Sep. 3, 1991

[54] ANGULARLY ADJUSTABLE PIPE CONNECTOR

[75] Inventor: Thomas R. Hendrickson, Montezuma, Mich.

[73] Assignee: Quikcoup, Inc., Pontiac, Mich.

[21] Appl. No.: 563,315

[22] Filed: Aug. 3, 1990

[51] Int. Cl.$^5$ ............................................. F16L 27/00
[52] U.S. Cl. ................... 285/168; 285/176; 285/181; 285/31; 285/64; 285/184; 285/112
[58] Field of Search ............... 285/168, 176, 181, 184, 285/112, 19, 20, 31, 64

[56] References Cited

U.S. PATENT DOCUMENTS

| | | | |
|---|---|---|---|
| 930,060 | 8/1909 | Eynon | 285/181 |
| 1,285,849 | 11/1918 | Walling | 285/181 X |
| 1,756,094 | 4/1930 | McGuirk | 285/181 |
| 2,451,587 | 10/1948 | Taylor | 285/112 |
| 2,581,047 | 1/1952 | Salmond et al. | 285/181 |
| 3,302,315 | 2/1967 | Himes | 285/181 X |
| 3,476,410 | 11/1969 | Pastva, Jr. | 285/112 |
| 3,756,629 | 9/1973 | Gibb | 285/112 |
| 4,601,495 | 7/1986 | Webb | 285/112 |
| 4,615,547 | 10/1986 | Sutcliffe et al. | 285/186 X |

FOREIGN PATENT DOCUMENTS 649992  12/1928  France ................... 285/181

Primary Examiner—Dave W. Arola
Assistant Examiner—Heather Chun
Attorney, Agent, or Firm—Harness, Dickey & Pierce

[57] ABSTRACT

A pipe connector for connecting a pair of conventional, circular cross-section pipes whose axes are generally coplanar but are angled relative to each other, is formed of a pair of identical, but reversely arranged, tubular sections, each having an outer end for coupling to an adjacent pipe end and an inner end coupled to the adjacent section inner end. The coupling comprises conventional, releasable, circular pipe couplings which surround and clamp adjacent pipe ends together. The connector sections are bent and flattened in cross-section so that their inner ends are engaged in the plane of the pipe axes while their outer end openings are transverse to the pipe axes and overlap and open into the ends of the pipes. The portions of the connector sections between their opposite ends are of cross-sectional areas that are roughly the same as the cross-sectional areas of their end openings. Because the connector sections are flattened towards the plane of the pipe axes, the overall, outermost distance of the connector from the pipe axes is only slightly greater than the radius of the pipes themselves.

1 Claim, 1 Drawing Sheet

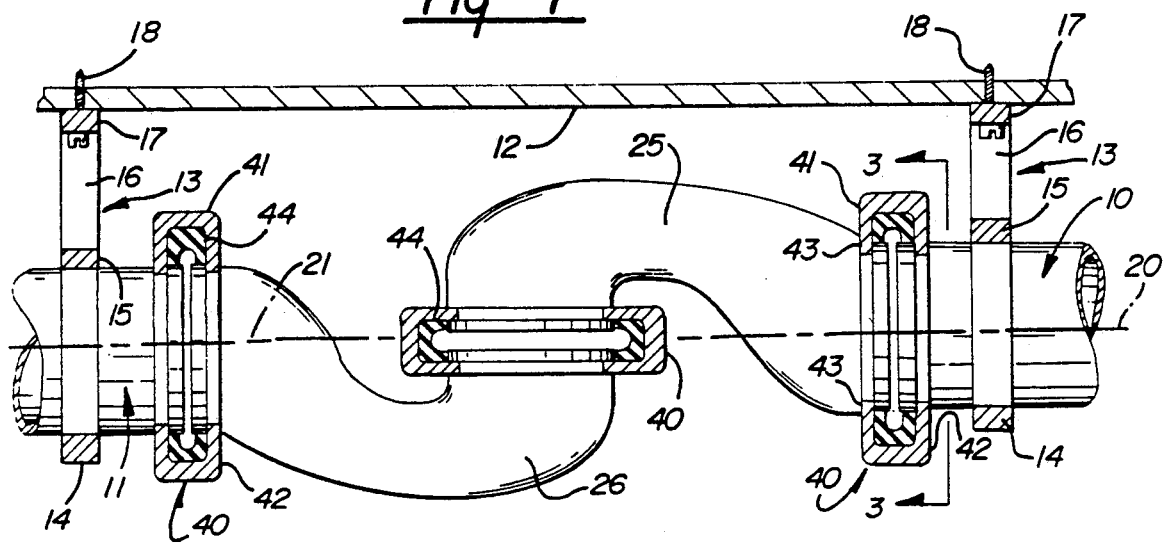
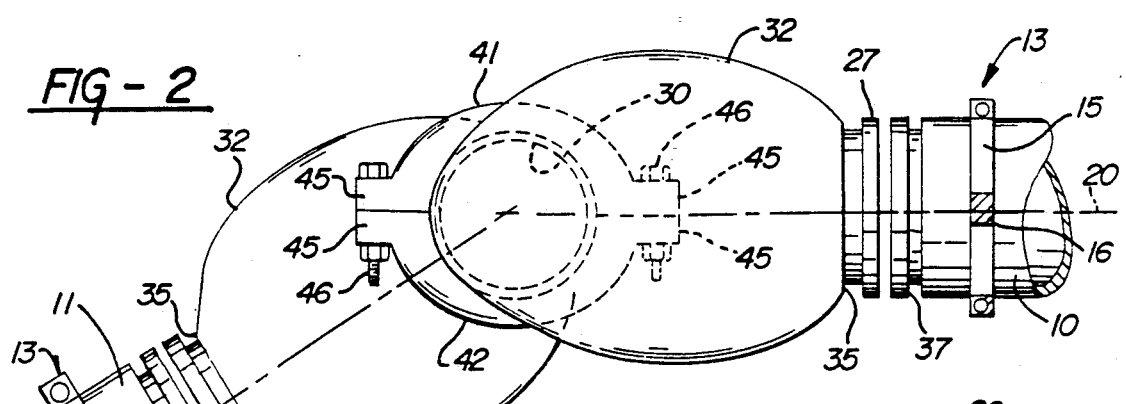
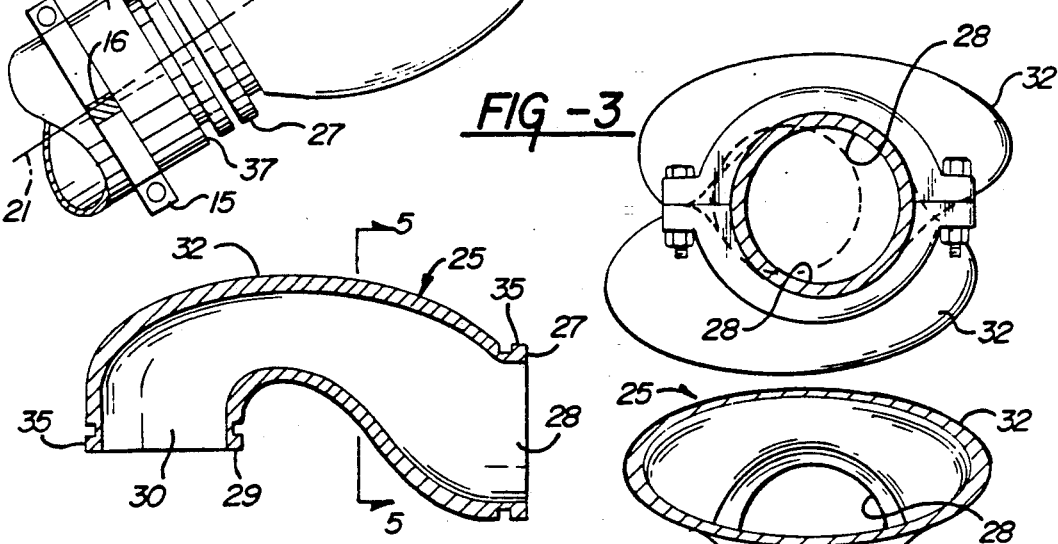

ANGULARLY ADJUSTABLE PIPE CONNECTOR

BACKGROUND OF INVENTION

This invention relates to a pipe connector which is angularly adjustable for connecting together adjacent end of pipes that are arranged at different angles.

In many types of buildings, such as warehouses, factories, garages and the like, water carrying pipes are required for water sprinkling systems, water distribution systems and the like. Thus, it is common to install relatively large diameter, metal pipes near the ceiling of each floor of the building, with the pipes located a relatively short distance beneath the ceiling. When a new building is constructed, it is relatively easy to install such pipes since they may pass through, or be easily arranged around, obstacles such as walls and other internal structures installed in the buildings. However, in pre-existing buildings, particularly where an old building is renovated or where water lines are added to a building for water new sprinkler systems, the installation of pipes is relatively difficult because of existing obstacles that are in the path of the pipes. These require angled couplings between straight pipes to bypass obstacles.

Typically, a pipe installation contractor measures and determines the locations of obstacles in the paths of the pipes and the angles necessary between connected pipes to bypass obstacles or to otherwise change the direction of pipe lines within a particular structure. Then, the contractor orders pipe connectors or joints to be made for each of the junctures between two pipes that are to be angled relative to each other. For example, if a first pipe must joint a second pipe which is arranged at a 15 degree angle to the first pipe, the contractor orders a special pipe connector which is bent 15 degrees and whose opposite ends each connect to the two pipes so that they are joined together at the required angle. Those connectors are ordinarily made by connector manufacturers who either custom bend the pipe sections to the ordered angles, or who fabricate bent tubes by cutting short sections of pipe and welding the sections together at the required angles to provide the angled connector. These custom bent or fabricated angled couplings are then brought to the job site where they ar used for connecting the piping at their particular angled locations.

Because of the need for many different angled connectors, a considerable amount of time is required in installing pipe systems. That is, considerable time is required to determine the angles of connection between adjacent pipes in various locations in the building. Then, the specific angled connectors must be ordered and custom manufactured. Next, they must be brought to the job site for installation at their specific locations. Correlating each angled connector with its specific location requires considerable labor.

Frequently, the angled connectors are inaccurately made, or the initial measurements turn out to have been inaccurate so that the angled couplings do not properly fit in their specific locations, thereby requiring re-ordering. Sometimes angles must be changed while the pipes are installed. Thus, it would be desirable to provide a suitable connector which satisfies plumbing codes and which provides fluid tight connections between angularly arranged pipes, which connector can be angularly adjustable on the job site and, consequently, eliminate the need for custom made angled connectors.

Conventional pipe couplings for connecting the adjacent ends of coaxially arranged pipes are formed of arcuate sections that are bolted together to form a circle around a pair of adjacent pipe ends for gripping the ends and holding the ends together. Typically, grooves are formed in the outer surfaces of the pipe end portions. Conventionally, the couplings are U-shaped in cross-section and the free ends of their U-shaped legs are fitted within the grooves. This locks the coupling against the surfaces of the pipes. Commonly, rubber-like gaskets are installed around the pipe ends, within the U-shaped couplings, for sealing against each of the adjacent pipe end portions. However, these conventional circular couplings, which come in a variety of shapes and styles are not usable for coupling pipes that are angled relative to each other.

This invention is concerned with an angularly adjustable pipe connector which utilizes conventional pipe couplings, which meet normal plumbing codes, for interconnecting the ends of a pair of angularly arranged pipes.

SUMMARY OF INVENTION

This invention relates to connectors for fastening together pairs of pipe ends, where the pipes are arranged in a common plane, such as a horizontal plane, but where their axes are angled relative to each other at angles which may differ for each pair of pipe ends. The connector comprises a pair of substantially identical, relatively short lengths of tubing. These tubing lengths or sections are joined together at overlapping open ends which lie in the plane of the pipe axes. The connectors each have opposite, outer ends, which are arranged transversely of the axes of the pipes and which overlap and are arranged adjacent to the pipe ends. The connector outer ends and their adjacent pipe ends are joined together with conventional circular, mechanically fastened pipe couplings. The connector inner ends, that is, the ends that are arranged adjacent each other and are within the plane containing the pipe axes, are also joined together with conventional, circular pipe couplings.

It is contemplated to form the tubular connector sections with flattened, laterally bulged portions whose cross-sectional areas correspond to the cross-sectional areas of the open, circular ends of the connectors. Thus, the cross-sectional areas of the connection are about the same as the cross-sectional areas of the pipes even though the connectors are oval in cross-section for most of their lengths. The two connector sections are joined together by a conventional coupling so that they may be angularly arranged relative to each other at the time of installation when the coupling is tightened around their adjacent ends. Consequently, by utilizing identical, curved connector sections, the plumbing contractor need only carry an assortment of pairs of connectors which are of the same size as correspondingly sized pipes whose ends are to be connected, and conventional couplings. By coupling each connector section to its adjacent pipe end and then coupling the two connector sections to each other at whatever angle is encountered, there is no need to use pre-formed custom angled connections. In this manner, this invention provides the means for rapidly coupling together coplanar pipes, such as pipes located beneath the ceiling of a room, even though the angles of adjacent pipes relative to each other may vary.

An object of this invention is to eliminate conventional, pre-formed, angular pipe couplings which must be custom made, such as by bending a tube or by cutting and welding pipe sections to predetermined angles, for each juncture of each pair of angularly arranged pipes.

Another object of this invention is to provide a simplified, low labor, inexpensive connecting system for joining the ends of pipes together, regardless of their relative angularity, at the site where the pipes are to be connected, without the need for measuring, ordering special connectors, shipping such special connectors to the particular required location and fastening each custom manufactured connector, to its particular pair of pipes.

Yet another object of this invention is to provide a system whereby a contractor may utilize pair of identical connector tubes which are joined together at adjacent ends and joined, at their opposite ends, to angularly disposed pipes for interconnecting the ends of said pipes by utilizing conventional, code approved, pipe couplings.

An additional object of this invention is to provide a connector system which, while accommodating and connecting together pipes located at different angles relative to each other, does not reduce or restrict the area of the flow of fluid through the pipes and the connected joint.

These and other objects and advantages of this invention will become apparent upon reading the following description, of which the attached drawings form a part.

DESCRIPTION OF DRAWINGS

FIG. 1 is an elevational view, partially in cross-section, showing the connector of this invention joining the ends of two pipes which are horizontally arranged, but which are angled relative to each other.

FIG. 2 is a plan view of the connector and pipes, illustrating the angled relationship of the pipes. FIG. 2 omits the pipe couplings, for illustration purposes.

FIG. 3 is a cross-sectional view taken as if in the direction of arrows 3—3 of FIG. 1.

FIG. 4 is a cross-sectional, elevational view, of one of the two connector sections.

FIG. 5 is a cross-sectional view of a connector section taken in the direction of arrows 5—5 of FIG. 4.

DETAILED DESCRIPTION

FIGS. 1 and 2 illustrate a pair of conventional water pipes 10 and 11 such as are used for conducting water through a building structure, as part of a water sprinkling system. These pipes may be arranged vertically or in other planes. However, the connector of this invention is particularly useful for pipes that are located in horizontal or approximately horizontal planes and which must be angled around obstacles found within a building.

The pipes are shown as being suspended from a ceiling or rafters or floor joists 12 by means of conventional, pipe support brackets 13 which are schematically shown. These brackets comprise a lower, 180 degree arcuate section 14, connected by bolts or screws to an upper arcuate section 15. A vertical support 16, made of strip metal or rod metal is provided with an upper fastening flange 17 which is secured by a suitable fastener 18, such as a nail, bolt or screw, to the ceiling, rafter or floor joist.

In the installation described above, it is common to keep the pipes a predetermined distance beneath the plane of the ceiling or lower edges of the rafters or joists. Thus, the pipes 10 and 11 are illustrated with their respective axes 20 and 21 located in a horizontal plane. However, as illustrated in FIG. 2, the two axes 20 and 21 are angled relative to each other at a angle which will vary from one pipe juncture to another, depending upon the local conditions or obstacles around which the pipes must be positioned.

In order to fasten the ends of the two pipes together, a pair of tubular connector sections 25 and 26 are provided. Preferably, these sections are identical or substantially identical and may be manufactured by a conventional foundry casting process. Thus, a single casting shape is sufficient to provide both connector sections. These sections may be made in different sizes, to accommodate different diameter pipes. By using pairs of identical sections, the number of different castings and the inventory of different connector sections are considerably reduced.

Each connector section has an outer end 27 with an outer circular opening 28 that matches the pipe end opening to which it will be connected. Likewise, each connector section includes an inner end 29 having an inner, circular opening 30. The diameters of all the openings in the connector sections are the same size as the diameters of the pipes.

The sections are tubular but intermediate their ends, they are flattened to form bulged center portions 32 that are approximately elliptically shaped in cross-section. In this manner, their major axes are parallel to the plane containing the axes of the pipes a illustrated in FIG. 5, for example. The cross-sectional areas of the flattened bulged center portion 32 ar approximately equal to the area of the circular openings so that the flow of fluid through the connector is unrestricted, notwithstanding the curves and the angularity of the two assembled sections. The overall height of the connector is only slightly more than the diameters of the pipes, as illustrated in FIG. 1. Thus, the pipes may be installed close to the ceiling.

A shallow, angular groove 35 is formed in each of the opposite end portions of the connector sections. Similarly, a conventional, annular groove 37 is formed near the ends of the pipes.

Conventional pipe couplings 40 are provided for coupling the grooved end portions of the adjacent pipe and connector section ends. Such a pipe coupling is normally formed of a pair of arcuate, U-shaped in cross-section parts 41 and 42. The two arcuate parts are aligned so that the free ends of their legs 43 fit into the adjacent grooves formed in the pipes. A rubber-like, annular gasket 44 is arranged within the aligned parts t encircle and seal against the external surfaces of the adjacent pipe ends.

Conventional pipe couplings normally include lugs 45 that are integrally formed on their sections and these lugs are fastened together by bolts 46. Other forms of connections are also used conventionally and, therefore, for illustration purposes, a simple lug and bolt connection is schematically shown.

Significantly, conventional pipe couplings 40, regardless of the particular system for fastening the coupling parts together, are commonly acceptable under local building codes for fastening pipes together Thus, no special couplings are needed for this connector installation.

In operation, the plumbing contractor can install the pipes from their ceiling brackets at whatever angles are appropriate relative to each other. The adjacent ends of the pipes are connected together by fastening the outer ends of the connector sections to the pipe ends with conventional pipe couplings. That can be accomplished by loosely connecting the two sections together with a coupling that is not yet tightened in place. When the connector is secured to each of its adjacent pipe ends, the angular relationship between the connector sections is established and, at that point, the pipe coupling which joins the connector sections can be tightened. In that way, it is not necessary to know in advance the angle of the connection nor to use pre-formed angular connectors.

Since the diameters of the pipes may vary considerably, the connector sections will likewise vary in diameters. By way of example, the ends of the pipes and connectors may be of diameters ranging from 1½ to 6 inches for commonly used pipes.

In the event that a connector section is damaged or defective or for some other reason is not usable, it is a simple matter for the plumbing contractor to use another section from his inventory since each pair of connector sections are identical. But, in some instances, it may be desirable to utilize connectors that differ in shape or in size, but which still couple to each other and to the pipes in the same way as described above.

This invention may be further developed within the scope of the following claims. Accordingly, it is desired that the foregoing description be read as being merely illustrative of an operative embodiment of this invention and not in a strictly limiting sense.

Having fully described an operative embodiment of this invention, I now claim:

1. A connector for connecting together adjacent ends of a pair of conventional, circular in cross-section, pipes which have axes that are arranged substantially in the same plane but are angled relative to each other within that plane, comprising:

a pair of substantially identical tubular shaped, connector sections, each having an inner end with a circular opening for arrangement in said plane and an outer end with a circular opening for arrangement perpendicularly to said plane, and each of said connector sections, between their opposite circular ends, being curved and being flattened towards plane containing the pipe radii into a generally elliptically, bulged cross-sectional shape whose major axes are arranged roughly parallel to, but offset from the plane containing the pipe axes, whereby the overall radial distance from the pipe axes to the exterior of the respective connector elliptical sections is only slightly more than the radii of each pipe and the cross-sectional area of each connector section is about the same, along the length of that section, as the cross-sectional areas of each of its openings:

each of said outer end openings being adapted for axial alignment with and overlapping relationship with the opening of the adjacent end of one of the pipes;

the two inner ends openings normally overlapping each other and being coaxially aligned relative to each other, for being located approximately in the plane containing the pipe axes;

a mechanical, releasable, coupling means including a seal means shaped for encircling and securing each of the outer ends of the connector sections and their respective adjacent pipe ends for coupling and sealing the adjacent ends together;

a mechanical, releasable coupling means including a seal means encircling and securing and sealing the two connector section inner ends together;

said coupling means being manually releasable for removing and applying the connector to adjacent pipe ends and for adjusting the angularity of the two connector sections relative to each other for corresponding to the relative angles of their respective pipe ends, said coupling means comprising a conventional, circular pipe coupling formed of arcuate coupling sections that are fastened together and with the coupling formed for surrounding and clamping together the adjacent end portions of the pipe ends and their respective connector section outer ends and the adjacent connector section inner ends, and annular grooves formed in each of the outer surface portions of each of the pipe ends and coupling section ends, and said pipe couplings each being U-shaped in cross-section so that the free ends of the legs defining the U-shaped cross-sections, extends radially inwardly into said grooves for positively fastening the connector sections to their respective pipe end portions and the connector sections to each other.

* * * * *